Dec. 31, 1935.  S. GUARNASCHELLI  2,026,167

SWIVEL COUPLING

Filed April 30, 1934

INVENTOR
Stephen Guarnaschelli
BY
Marshall H Hawley
ATTORNEYS

Patented Dec. 31, 1935

2,026,167

UNITED STATES PATENT OFFICE 2,026,167

SWIVEL COUPLING

Stephen Guarnaschelli, Brooklyn, N. Y., assignor to Packless Metal Products Corporation, New York, N. Y., a corporation of Delaware Application April 30, 1934, Serial No. 723,086

1 Claim. (Cl. 285—1)

This invention relates to swivel couplings.

More particularly stated, the invention relates to a swivel coupling adapted for connecting and establishing communication between two pipe sections or conduits.

Swivel couplings for pipes or conduits are common and are used in many fields. Most of the couplings now in use have packings therein to prevent leakage between the relatively movable parts of the coupling. This is objectionable since the relative swiveling movement tends to wear and displace the packings, thus rendering them ineffective.

This invention has for its salient object to provide a swivel coupling that is simple in construction, comprises few parts, is substantially leak-proof and accomplishes this result without the use of packing.

Figure 1:
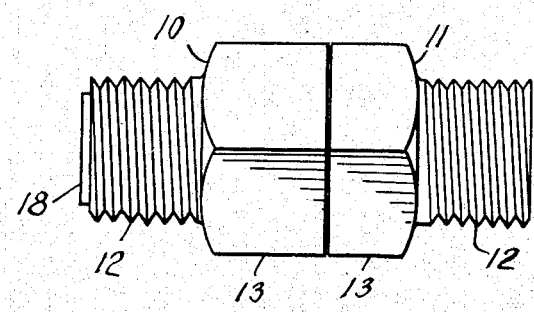
Figure 2:
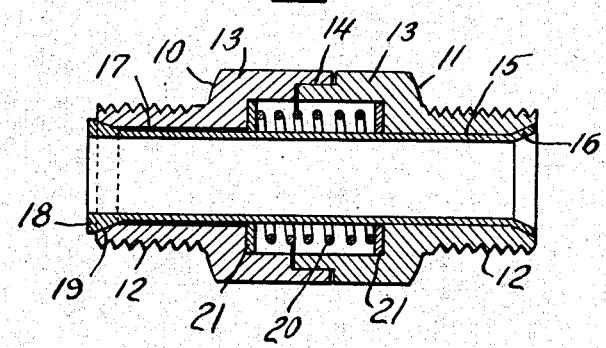

Further objects of the invention will appear from the following specification taken in connection with the drawing which forms a part of this application, and in which Fig. 1 is an elevational view of the coupling constructed in accordance with the invention; and Fig. 2 is a longitudinal sectional elevation of the coupling shown in Fig. 1.

The invention briefly described consists of a swivel coupling comprising a pair of coupling members and a sleeve disposed within these members and extending substantially throughout the lengths thereof. The sleeve is preferably held against movement relative to one member and seats against the outer end of the other member. The spring is housed within the coupling members and forces them in opposite directions causing the end of the sleeve to seat tightly against the coupling member engaged thereby.

Moreover, when the two coupling members are coupled into a pressure line, the pressure in the line tends to pull the members apart and to seat the ends of the members tightly against the ends of the sleeve without requiring the use of the spring to seat the end of the coupling member not secured to the sleeve.

Further details of the invention will appear from the following description.

In the particular embodiment of the invention illustrated in the drawing, the coupling comprises a pair of coupling members 10 and 11, each member having a threaded portion 12 at one end and an enlarged recessed portion 13 at the other end, the portions 13 being disposed in telescoping or overlapping relation, as shown at 14.

A sleeve 15 is mounted in the coupling sections 10 and 11 and extends substantially therethrough, one end of the sleeve, as shown at 16, being preferably secured to one of the coupling members, such as member 11. A slight clearance, as shown at 17, is provided between the other end of the sleeve 15 and the coupling member 10 and the outer end of this portion of the sleeve is provided with an outwardly inclined conical seat 18. The coresponding end of the coupling member 10 is provided with a conical seat 19 tapered to correspond with the conical end 18.

A spring 20 is housed in the recesses in the portions 13, 13 and bears at its ends against thrust washers 21, 21 the spring exerting pressure on the coupling members 10 and 11 in opposite directions and causing the outwardly inclined conical end 18 of the sleeve 15 and the conical seat 19 in the outer end of the coupling 11 to be forced into tight engagement with each other.

The two coupling members 10 and 11 with the spring 20 and washers 21, 21 therein are first assembled and are held in position to compress the spring 20. The sleeve 15 is then inserted in the coupling members and is held in position with the end 18 of the sleeve seating tightly against the conical seat 19. The other end of the sleeve is then expanded or forced outwardly into tight engagement with the bore of the coupling member 11 and the end of the sleeve is flared outwardly against the conical seat in the outer end of the member 11.

The swivel coupling above described may be used to connect any forms of conduits or pipes, these parts being threaded onto the outer ends of the coupling. It will be obvious from the above description that the coupling will be leakproof and that no packings are required to accomplish this result.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claim.

What I claim is:

A swivel coupling comprising a pair of members having overlapping, recessed, inner portions and having elongated outer bearing portions, a sleeve disposed within and extending substantially through said members and closely surrounded by said outer bearing portions, said sleeve having a cylindrical outer surface of substantially uniform diameter throughout its length and having outwardly inclined ends engaging the ends of the members, and a spring housed within and acting on the coupling members and forcing them in opposite directions thus causing the ends of the members to seat against the inclined ends of the sleeve.

STEPHEN GUARNASCHELLI.